US012657688B2

(12) United States Patent
Wang et al.

(10) Patent No.: US 12,657,688 B2
(45) Date of Patent: Jun. 16, 2026

(54) METHOD AND DEVICE FOR DETECTING WORD LINE SHORTS IN MEMORY DEVICE

(71) Applicant: Yangtze Memory Technologies Co., Ltd., Wuhan (CN)

(72) Inventors: Wenqi Wang, Wuhan (CN); Wenlong Li, Wuhan (CN); Ban Wang, Wuhan (CN); Jinxing Chen, Wuhan (CN); Yanli Wang, Wuhan (CN); Zongliang Huo, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 645 days.

(21) Appl. No.: 18/090,146

(22) Filed: Dec. 28, 2022

(65) Prior Publication Data

US 2024/0202909 A1 Jun. 20, 2024

(30) Foreign Application Priority Data

Dec. 14, 2022 (CN) ......................... 202211609207.X

(51) Int. Cl.
| | |
|---|---|
| *G06T 7/00* | (2017.01) |
| *G06T 7/13* | (2017.01) |
| *G06T 7/136* | (2017.01) |
| *G06T 7/70* | (2017.01) |

(52) U.S. Cl.
CPC ................ *G06T 7/001* (2013.01); *G06T 7/13* (2017.01); *G06T 7/136* (2017.01); *G06T 7/70* (2017.01); *G06T 2207/10024* (2013.01); *G06T 2207/20021* (2013.01); *G06T 2207/30148* (2013.01)

(58) Field of Classification Search
CPC ........... G06T 7/001; G06T 7/136; G06T 7/13; G06T 7/70; G06T 2207/10024; G06T 2207/20021; G06T 2207/30148
See application file for complete search history.

(56) References Cited

U.S. PATENT DOCUMENTS

| | | | | |
|---|---|---|---|---|
| 2012/0169579 A1* | 7/2012 | Nishi | ................... | G09G 3/3659 |
| | | | | 345/98 |
| 2022/0043054 A1* | 2/2022 | Yen | ....................... | G01R 31/307 |
| 2022/0342316 A1* | 10/2022 | Kooiman | ................ | G06T 7/001 |

* cited by examiner

*Primary Examiner* — Mark D Featherstone
*Assistant Examiner* — Victor Perry
(74) *Attorney, Agent, or Firm* — Anova Law Group, PLLC

(57) ABSTRACT

A method for detecting word line shorts in a memory device includes: determining a region of interest (ROI) region in a bright voltage contrast (BVC) image for contact through-holes (CTs) of word lines in the memory device, the CTs comprising first CTs in at least one first word line that is electronically charged and second CTs in at least one second word line that is not electronically charged, and the ROI region comprising the at least one first word line; determining coordinates of each CT in the ROI region; reviewing a grayscale value at a position of the coordinates of each CT in the ROI region to determine whether the CT is a defective CT; and displaying the defective CT in response to the defective CT being determined.

16 Claims, 4 Drawing Sheets

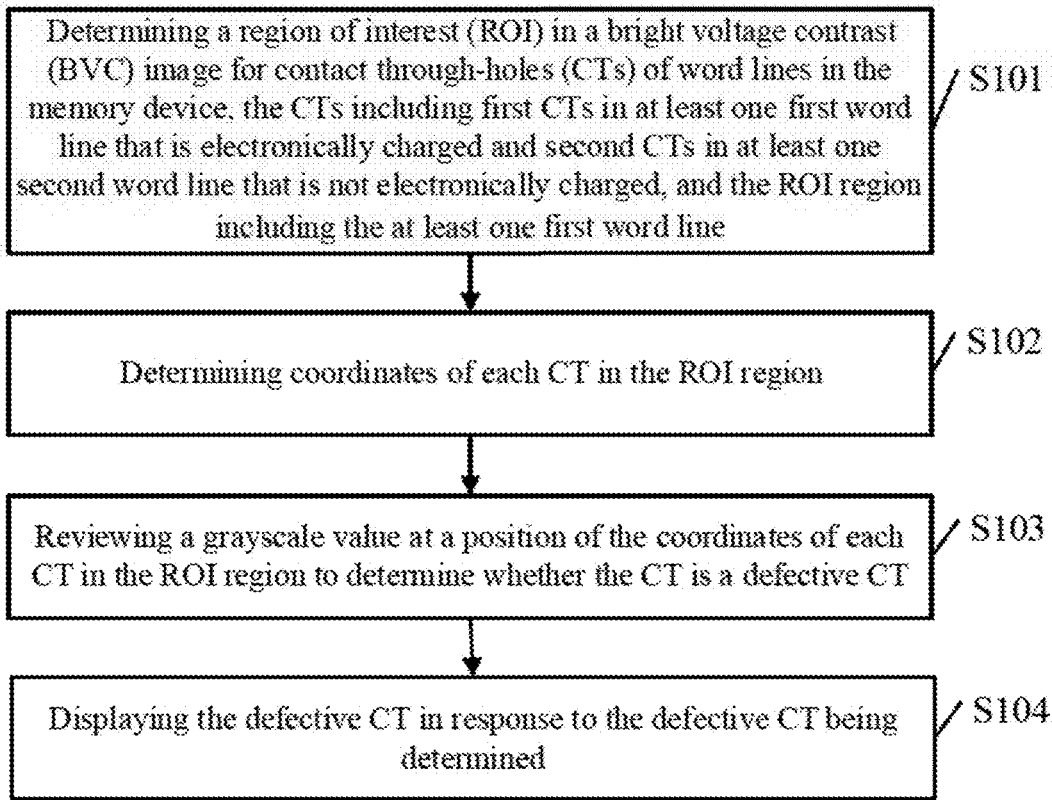

Determining a region of interest (ROI) in a bright voltage contrast (BVC) image for contact through-holes (CTs) of word lines in the memory device, the CTs including first CTs in at least one first word line that is electronically charged and second CTs in at least one second word line that is not electronically charged, and the ROI region including the at least one first word line       S101

Determining coordinates of each CT in the ROI region       S102

Reviewing a grayscale value at a position of the coordinates of each CT in the ROI region to determine whether the CT is a defective CT       S103

Displaying the defective CT in response to the defective CT being determined       S104

FIG. 1

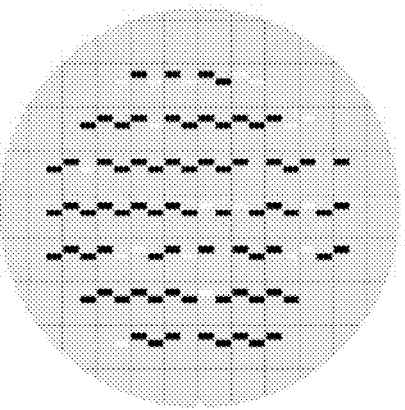

FIG. 2

ROI

Calculating grayscale value

Gaussian smooth

Erosion

Assigning binary value

Identifying contour

CT coordinates

METHOD AND DEVICE FOR DETECTING WORD LINE SHORTS IN MEMORY DEVICE

CROSS-REFERENCE TO RELATED APPLICATION

This application claims the priority of Chinese Patent Application No. 202211609207.X, filed on Dec. 14, 2022, the content of which is incorporated herein by reference in its entirety.

TECHNICAL FIELD

The present disclosure relates to the technical field of semiconductor device manufacturing and, more particularly, to a method and a device for detecting word line shorts in a memory device.

BACKGROUND

When manufacturing a three-dimensional (3D) memory array, a staircase tread area is formed at an end of each stacked structure including alternately stacked insulating layers and conductive gate layers. Contact through-holes (CT) connecting to the gate layers in the tread areas are formed by etching in tread areas. The CTs are then filled to form conductive plugs, which are used to bring out electrical signals from the gate layers.

As memory technologies advance and memory capacity needs grow, distribution structure of 3D memory arrays is often adjusted accordingly. When multiple positions of a same memory array (at least hundreds of thousands of positions), such as multiple previously described CT positions are inspected by an electronic beam (E-Beam) inspection machine to detect leakage on the CTs, it is difficult to rapidly match at least hundreds of thousands of detected bright voltage contrast (BVC) positions with corresponding CT positions due to rapid change of CT distribution. Thus, it is difficult to accurately identify the CT positions corresponding to BVC positions indicating defects, thereby making it difficult to locate defective CT positions.

SUMMARY

One aspect of the present disclosure provides a method for detecting word line shorts in a memory device. The method includes: determining a region of interest (ROI) region in a bright voltage contrast (BVC) image for contact through-holes (CTs) of word lines in the memory device, the CTs comprising first CTs in at least one first word line that is electronically charged and second CTs in at least one second word line that is not electronically charged, and the ROI region comprising the at least one first word line; determining coordinates of each CT in the ROI region; reviewing a grayscale value at a position of the coordinates of each CT in the ROI region to determine whether the CT is a defective CT; and displaying the defective CT in response to the defective CT being determined.

Another aspect of the present disclosure provides a device for detecting word line shorts in a memory device. The device includes a display screen, a memory storing program instructions, and a processor configured to execute the program instructions stored in the memory to determine a region of interest (ROI) region in a bright voltage contrast (BVC) image for contact through-holes (CTs) of word lines in the memory device, the CTs comprising first CTs in at least one first word line that is electronically charged and second CTs in at least one second word line that is not electronically charged, and the ROI region comprising the at least one first word line; determine coordinates of each CT in the ROI region; review a grayscale value at a position of the coordinates of each CT in the ROI region to determine whether the CT is a defective CT; and display the defective CT in response to the defective CT being determined.

Another aspect of the present disclosure provides a non-transitory computer-readable storage medium storing a computer program for detecting word line shorts in a memory device. The computer program performs: determining a region of interest (ROI) region in a bright voltage contrast (BVC) image for contact through-holes (CTs) of word lines in the memory device, the CTs comprising first CTs in at least one first word line that is electronically charged and second CTs in at least one second word line that is not electronically charged, and the ROI region comprising the at least one first word line; determining coordinates of each CT in the ROI region; reviewing a grayscale value at a position of the coordinates of each CT in the ROI region to determine whether the CT is a defective CT; and displaying the defective CT in response to the defective CT being determined.

BRIEF DESCRIPTION OF THE DRAWINGS

To more clearly illustrate the technical solution in embodiments of the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

FIG. 1 is a schematic flowchart of an exemplary method of word line short auto-detection according to embodiments of the present disclosure;

FIG. 2 is a schematic diagram of an exemplary wafer divided into a plurality of portions according to embodiments of the present disclosure;

DETAILED DESCRIPTION OF THE EMBODIMENTS

Figure 3:
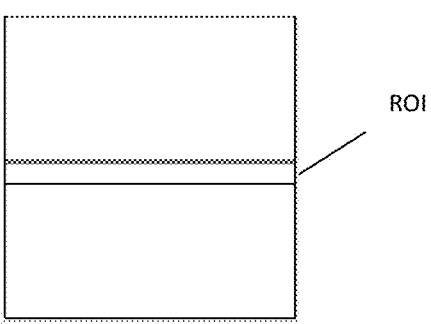
FIG. 3 is a schematic diagram of an exemplary region of interest (ROI) region in a bright voltage contrast (BVC) image according to embodiments of the present disclosure.

Technical solutions in the embodiments of the present disclosure will be clearly described below with reference to the accompanying drawings. It will be appreciated that the described embodiments are some rather than all of the embodiments of the present disclosure. Other embodiments obtained by those having ordinary skills in the art on the basis of the described embodiments without inventive efforts should fall within the scope of the present disclosure.

Embodiments of the present disclosure will be described in detail in connection with the drawings. Under circumstances of no conflict, the following embodiments and features in the embodiments may be combined with each other.

The present disclosure may be applied to testing three-dimensional (3D) NAND memory arrays. When manufacturing the 3D NAND memory arrays, a staircase tread area is formed at an end of each stacked structure including alternately stacked insulating layers and conductive gate layers. Contact through-holes (CTs) connecting to the gate layers in the tread areas are formed by etching in tread areas. The CTs are then filled to form conductive plugs, which are used to bring out electrical signals from the gate layers.

As the demand for data storage density continues to increase, the number of layers of the stacked structure increases accordingly. When forming the CTs, to ensure that the gate layers in lower staircase tread areas relatively close to a substrate can be successfully connected, the gate layers in upper staircase tread areas relatively far away from the substrate may be easily over etched to cause etching through or punch through, thereby resulting in shorts between two adjacent gate layers through the conductive plugs and reducing production yield. Those skilled in the art should understand that the 3D memory arrays tested by the embodiments of the present disclosure are not limited to the devices that have completed all the manufacturing processes, and may include the 3D memory array structures on the production line after the CTs have been formed.

In practical inspection processes, voltage contrast (VC) methods are often used to detect whether the CTs have leakage currents. The CT positions indicated in VC image may be inspected for defects. The operation principle is to bombard bottoms of the CTs with a focused electron beam (E-beam) to excite secondary electrons. The number of secondary electrons generated at defective CTs and normal CTs are different, and corresponding transmission efficiencies are different as well. A secondary electron distribution may be captured in a voltage contrast image as brightness variation in the voltage contrast image. Thus, the defective CTs may be determined by examining brightness variation in the voltage contrast image.

The E-beam inspection includes bright voltage contrast (BVC) and dark voltage contrast (DVC). The BVC is often used to detect leakage current induced defects. The DVC is often used to detect openings caused by defects in the conductive plugs. In practical detection processes, a scope of the detection may include a memory chip (a smallest unit that can independently execute commends or report status) or a memory block (a smallest unit that can be erased by a single erase operation). The number of CTs to be inspected may be at least several hundred thousand. When some CTs included in the voltage contrast images are diagnosed to have leakage currents, it is important to locate the defective CTs in the memory chip or the memory block for subsequent processing.

The 3D NAND memory arrays often include a plurality of contact through-holes (CT) connecting to gate layers at different tiers to form word lines. In a process of manufacturing such 3D memory array devices, an E-beam machine is often used to scan a wafer to detect defective CTs that cause current leakage between different word lines. In a scanning process, the CTs are charged by an electron beam word line by word line to look for current leakage between adjacent word lines. In a BVC image, the charged CTs look brighter than the CTs that are not charged. However, when a charged CT is connected to a leaked word line (i.e., shorted to an adjacent word line that is not charged), the charged CT no longer looks bright. On the other hand, the CTs that are not charged but connected to the adjacent word line that is shorted to the leaked word line may look bright. Currently, the CTs that are charged by the electron beam and the CTs that are charged by leakage currents cannot be differentiated by existing tools. By manually examining CTs in the voltage contrast images scanned by the E-beam machine, a technical person may determine whether the CTs that look brighter are normal or defective. The defective CTs are charged by the leakage currents and are causing word line shorts. However, manually examining the voltage contrast images takes about a half day for one person to finish examining one wafer. Further, the manual examination or inspection is not sufficiently accurate, is unable to group the defective CTs by tier, and is unable to visually illustrate distribution of the defective CTs on a wafer level map.

FIG. 1 is a schematic flowchart of a method of word line short (WLS) auto-detection according to embodiments of the present disclosure. As shown in FIG. 1, the method includes the following processes.

At S101, a region of interest (ROI) region is determined in a bright voltage contrast (BVC) image for CTs of word lines in the memory device, the CTs including first CTs in at least one first word line that is electronically charged and second CTs in at least one second word line that is not electronically charged. The ROI region includes the at least one first word line.

In some embodiments, 3D memory arrays are formed on the wafer. The 3D memory arrays include word lines. The at least one first word line receives the electron beam to be charged to test for current leakage between the at least one first word line and adjacent second word line. An E-beam machine is often used to capture BVC images of the wafer. Due to certain limitation of the E-beam machine, multiple BVC images may be captured to cover the entire wafer. Because the wafer is divided into small portions without considering word line distribution, some BVC images may include multiple first word lines, and some BVC images may include no first word line, that is, no ROI region can be determined. The ROI region includes at least one first word line. In some embodiments, multiple first word lines may be consecutively arranged. In this case, the multiple first word lines are often located in a same gate layer. In some embodiments, multiple first word lines may be located in different gate layers.

Further, different word lines are selected and charged to test the current leakage between adjacent word lines. For example, to cover one entire wafer, five tests need to be conducted. Each test produces 210 images. Each image includes 8 groups of CTs. Thus, to completely inspect the entire wafer, a huge number of the BVC images of the wafer need to be examined or processed. Because the BVC images include similar contents, the BVC images are examined or processed in a similar manner. In the embodiments of the present disclosure, only one BVC image is used to describe the processes of the disclosed method.

In some embodiments, in one test, some word lines may be selected to be charged by the electron beam to test current leakage between adjacent word lines. In another test, some other word lines may be selected to be charged by the electron beam to test the current leakage between adjacent word lines. Different word lines are selected to be charged by the electron beam to extend test coverage. In addition, multiple first word lines located in a same gate layer are selected consecutively in the current leakage tests. The number of the multiple first word lines that are charged by the electron beam is predetermined. For example, the number is 3.

At S102, coordinates of each CT are determined in the ROI region.

Figure 4:
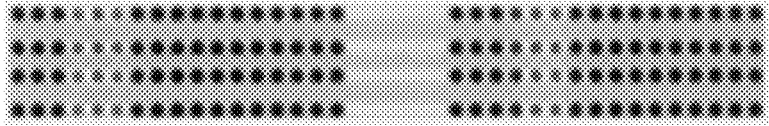
FIG. 4 is a schematic diagram of a plurality of contact through-holes (CTs) in the ROI region according to embodiments of the present disclosure.

In some embodiments, the BVC image includes only a small portion of the wafer, and the CTs only occupies a small portion of the BVC image. For example, as shown in FIG. 2, the wafer is divided into a plurality of squares. Each square represents multiple BVC images. The BVC image is analyzed to determine the portion of the BVC image that includes at least one first word line, that is, the region of interest (ROI) region of the BVC image. For example, as shown in FIG. 3, the portion of the BVC image highlighted in the middle is the ROI region. The at least one first word line within the image is only located inside the ROI region. There is no word line located outside the ROI region. For example, as shown in FIG. 4, the CTs in the ROI region includes bright CTs representing the charged CTs in the at least one first word line, dark CTs representing the uncharged CTs in the at least one second word line, and a gap in the middle without any CT. The charged CTs often look brighter than the uncharged CTs. The charged CTs may include CTs that are charged by the electron beam and CTs that are charged by leakage currents.

After the ROI region is determined, an image processing is performed on the ROI region to determine the coordinates of each CT in the ROI region. In some embodiments, the coordinates are relative to a reference CT in the ROI region, for example, the CT in the upper left corner of the ROI region. In some other embodiments, the coordinates are relative to a reference point in the ROI region, for example, the upper left corner point of the ROI region.

Figure 5:
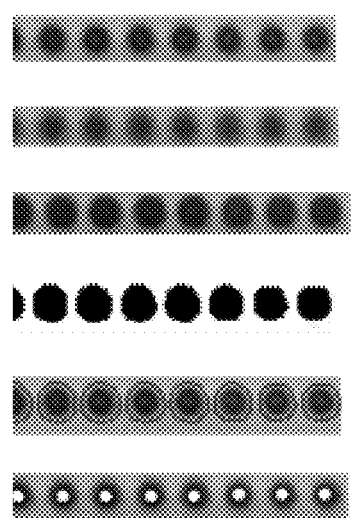
FIG. 5 is a schematic diagram of an exemplary image processing method according to embodiments of the present disclosure.

In some embodiments, as shown in FIG. 5, the image processing includes: calculating a grayscale value from red, green, and blue components for each pixel in the ROI region, where the grayscale value is an integer between 0 and 255 inclusively, the grayscale value for black is 0, and the grayscale value for white is 255; performing a Gaussian smooth process and an erosion process in the ROI region; performing a binarization process in the ROI region to form a plurality of black dots; identifying a contour for each black dot in the ROI region; and determining a center of each contour as the coordinates of each CT In some embodiments, the BVC image may be a color image. The color components may be converted into a grayscale value. For example, the grayscale value is calculated by the following equation:

$$Gray = 0.299 \cdot Red + 0.587 \cdot Green + 0.114 \cdot Blue,$$

where Gray, Red, Green, and B are an integer between 0 and 255 inclusively.

The grayscale value for black is 0 and the grayscale value for white is 255. A greater grayscale value indicates a brighter pixel and a smaller grayscale value indicates a darker pixel.

The voltage contrast or BVC images including the memory arrays often include a substrate image. When the number of the voltage contrasts is substantially large, a color of the substrate may easily reflect impacts caused by defective voltages. Converting color components into the grayscale values eliminates color variation noises of the substrate in the background, thereby avoiding overwhelming the voltage contrasts of the defects by the substrate in the color images or in the black and white images obtained by binarization. In addition, extracting grayscale features from the voltage contrast or BVC images facilitates subsequent contour extraction.

In some embodiments, when determining the center of each contour as the coordinates of each CT, a zero-order and a first-order moments of each contour is calculated to obtain the coordinates of the center of gravity of the corresponding contour; and the coordinates of the center of gravity of the corresponding contour is determined as the coordinates of each CT.

At S103, a grayscale value at a position of the coordinates of each second CT in the ROI region is reviewed to determine whether the CT is a defective CT.

Figure 6:
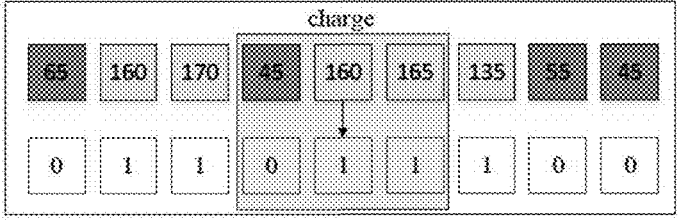
FIG. 6 is a schematic diagram of determining a charging state of each CT in the ROI region according to embodiments of the present disclosure.

In some embodiments, as shown in FIG. 6, each CT in a top row has a grayscale value. The grayscale value of each CT may be the grayscale value at the center of the corresponding CT. The grayscale value of each CT is an integer between 0 and 255 inclusively. The grayscale value of each CT is compared with a grayscale threshold to determine a charging state for the corresponding CT. The grayscale threshold is pre-determined and may be adjusted based on leakage current testing performance. A desired grayscale threshold leads to an accurate identification of CTs having leakage current and provides the optimal leakage current testing performance. For example, the grayscale threshold is 100. When a CT is charged, the CT looks bright and the grayscale value thereof is larger than the grayscale threshold. In this case, the charging state of the CT is 1. When a CT is not charged, the CT looks dark and the grayscale value thereof is smaller than the grayscale threshold. In this case, the charging state of the CT is 0. As such, the charging state of each CT is determined based on the grayscale value thereof.

In some embodiments, the grayscale value of each CT may be an average of grayscale values of a group of pixels surrounding the center of the corresponding CT. For example, grayscale values of a group of 10×10 pixels surrounding the center of a CT may be averaged to obtain the grayscale value of the CT. In another example, a CT may include one or more dark pixels at the center and may be surrounded by a ring of bright pixels which are 3 to 5 pixels away from the center. Grayscale values of the ring of bright pixels may be averaged to obtain the grayscale value of the CT. Other methods of calculating the grayscale value of the CT may be adopted as long as the obtained grayscale value of the CT accurately reflects a current leakage status of the CT.

After the charging state of each CT is determined, the at least one first word line may be located. An area in the ROI region including the charged CTs is called a charging area. Since the number of the at least one first word line is pre-determined, the pre-determined number of the word lines in a center of the charging area are the at least one first word line. For example, as shown in FIG. 6, the charging area only includes one row of CTs. Multiple CTs are in the charging state 1. The three CTs in the center of the charging area are the charged CTs located in three first word lines and are called first CTs, as indicated by a rectangle in FIG. 6. The two CTs on the left side of the CTs in the three first word lines and the one CT on the right side of the three first word lines are charged by leakage currents, are located in the second word lines, and are called second CTs. It should be noted that the fourth CT in FIG. 6 is one of the first CTs charged by the electron beam, but is not bright enough to be considered as in the charging state 1. This may be caused by various reasons discussed later in the specification.

Figure 7:
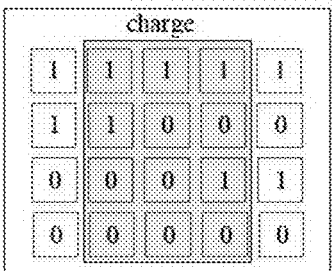
FIG. 7 is a schematic diagram of exemplary encoding rules according to embodiments of the present disclosure.

After the at least one first word line is determined, the charging states of the row of the CTs in FIG. 6 are encoded according to rules shown in FIG. 7. As shown in FIG. 7, each row of the CTs illustrates one current leakage scenario. In the first row, adjacent second CTs on both sides of the three first CTs in the first word lines are in the charging state 1. In this case, the current leakage occurs on both sides, and the charging states of the five CTs are encoded to 11111. In some embodiments, the charging states of the five CTs are encoded to 11011. In the second row, adjacent second CT on the left side of the three first CTs in the first word lines is in the charging state 1. In this case, the current leakage occurs only on the left side, and the charging states of the five CTs are encoded to 11000. In the third row, adjacent second CT on the right side of the three first CTs in the first word lines is in the charging state 1. In this case, the current leakage occurs only on the right side, and the charging states of the five CTs are encoded to 00011. In the fourth row, adjacent second CTs on both sides of the three first CTs in the first word lines are in the charging state 0. In this case, the current leakage occurs on neither side, and the charging states of the five CTs are encoded to 00000. Compared with the charging states of the CTs before being encoded, this encoding scheme highlights the CTs having leakage currents. In addition, severity of current leakage may be determined by counting a total number of 1's in the ROI region of the image.

In the embodiments of the present disclosure, the defective CTs refer to the CTs having the leakage currents. In other words, after the CTs having the leakage currents are determined, the defective CTs are detected.

In some embodiments, the grayscale values of all CTs are reviewed. After the grayscale value of the CT is determined to be larger than or equal to the grayscale threshold, whether the CT is receiving the electron beam is determined. When the CT is determined to be the CT receiving the electron beam, the CT is not the defective CT. When the CT is determined to be the CT not receiving the electron beam, the CT is the defective CT. That is, the CT not receiving the electron beam is receiving the leakage current to look bright.

At S104, the defective CT is displayed in response to the defective CT being determined.

Figure 8:
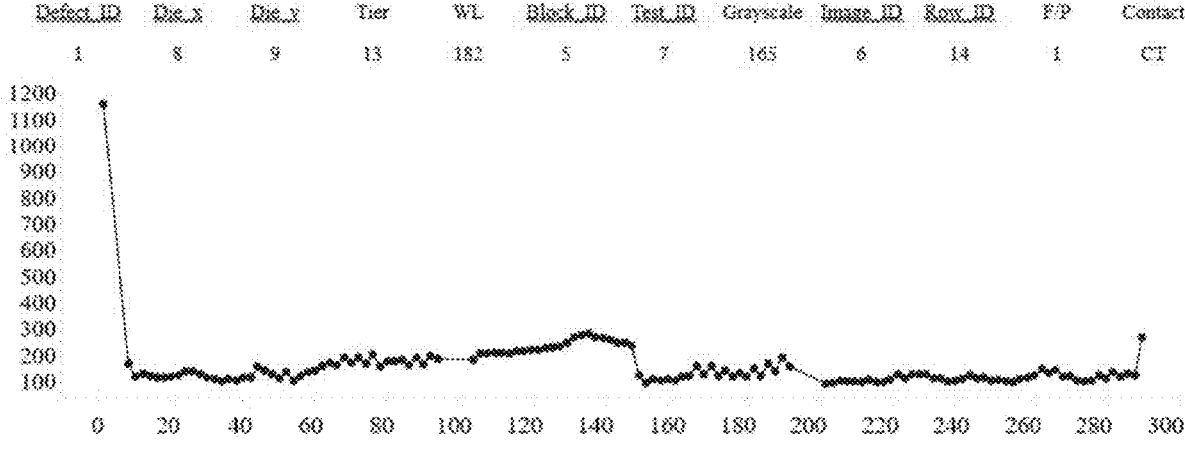
FIG. 8 is a schematic diagram of an exemplary word line short display in a tabular form and in a graphical form according to embodiments of the present disclosure.

A word line includes a column of CTs. When any CT in the column of CTs has the leakage current to an adjacent CT, the word line short occurs. As shown in FIG. 8, the defective CTs are listed in a table format and are also shown graphically under the table. For example, each defective CT in the table has a defect ID, coordinates of the upper left corner of the image in the entire wafer, a tier number (i.e., the gate layer number), a word line number, a circuit block ID, a test ID, a gray level or grayscale value, an image ID, a row ID, a pass/fail (i.e., 1 for fail and 0 for pass), and a contact type (i.e., a CT or a dummy). In the graphical display, the word line numbers are shown in a horizontal axis, and a count of defective CTs is shown in a vertical axis.

In addition, the defective CTs may be displayed on the wafer image as shown in FIG. 2. As shown in FIG. 2, the image of the entire wafer is divided into a plurality of square-shaped portions. Each square-shaped portion may include multiple BVC images. The upper left corner of each portion has a rectangular block for indicating a presence and severity of the word line shorts within the portion of the wafer. Absence of the block indicates absence of the defective CTs within the portion of the wafer. The severity or the number of the defective CTs within the portion of the wafer is indicated by either a grayscale value or a color of the rectangular block in the upper left corner.

In the embodiments of the present disclosure, inspection of the BVC image to automatically detect the defective CTs substantially reduces inspection time. For example, one wafer includes 1,050 BVC images of the wafer. It takes one-person one-half day to inspect the entire wafer for the defective CTs while it only takes about 174 seconds to inspect the entire wafer for the defective CTS. The less than three minutes inspection time is achieved by running a computer program implementing the disclosed method on a typically configured desktop computer. The computer configuration includes an Intel i7-8700 CPU @3.20 GHz, a GeForce GTX1060 (6 GB), 16 GB RAM, and 1 TB SSD. Further, the auto-detection method provides additional information that cannot be obtained during the manual inspection, such as by tier analysis and wafer level mapping. The accuracy of the auto-detection method is greater than 98%. Thus, the word line shorts auto-detection method takes less time, is more accurate, and provides more insights to the word line shorts defects.

In the embodiments of the present disclosure, the images to be inspected are not limited to the voltage contrast or BVC images of the CTs in the memory arrays. Other defects, such as CT open circuits, channel hole leakage, short circuits, open circuits, and word line leakage, may be detected and located through inspecting the voltage contrast or BVC images according to the embodiments of the present disclosure.

As previously described, certain factors may affect the accuracy of the word line shorts auto-detection. A first factor is that due to the limited resolution of the BVC image, the image processing may generate incorrect CT coordinates. A second factor is that the grayscale threshold may also affect the accuracy for detecting the charged CTs. A third factor is that the BVC images of many portions of the wafer may be slightly misaligned. One approach to improve the accuracy is to remove incorrectly determined CT coordinates after the CT coordinates are determined by the image processing.

In some embodiments, after the CT coordinates are determined by the image processing, the CT coordinates are sorted in the horizontal direction and the vertical direction. Redundant coordinates may be removed. Then, average gap distances between adjacent CTs are calculated in the horizontal and the vertical directions, respectively. The CT coordinates that do not fit a pattern separated by the average gap distances in the horizontal and the vertical directions may be removed. In other words, the coordinates of the CTs that substantially deviate from the calculated average gap distances in the horizontal direction and the vertical direction may be removed. For example, when two CT coordinates are too close to each other, one of them may be removed.

In some embodiments, a gap distance between two adjacent CTs in the horizontal direction is a difference between the coordinates of the two adjacent CTs in the horizontal direction. After the gap distances between any two adjacent CTs in the horizontal direction are calculated, an average of the gap distances in the horizontal direction is calculated by averaging the gap distances between any two adjacent CTs in the horizontal direction. Similarly, a gap distance between two adjacent CTs in the vertical direction is a difference between the coordinates of the two adjacent CTs in the vertical direction. After the gap distances between any two adjacent CTs in the vertical direction are calculated, an average of the gap distances in the vertical direction is calculated by averaging the gap distances between any two adjacent CTs in the vertical direction. In this wat, the average gap distances between adjacent CTs are obtained in the horizontal and the vertical directions, respectively.

Figure 9:
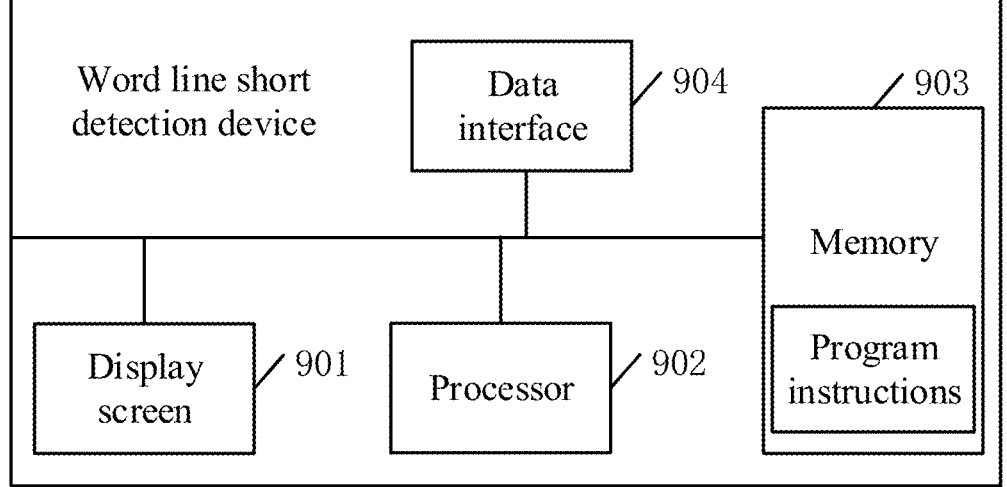
FIG. 9 is a schematic structural diagram of an exemplary device of word line short auto-detection according to embodiments of the present disclosure.

The present disclosure also provides a device for performing the disclosed method. FIG. 9 is a schematic structural diagram of an exemplary device of word line short auto-detection according to embodiments of the present disclosure. As shown in FIG. 9, the display device includes a display screen 901, a processor 902, a memory 903, and a data interface 904.

The display screen 901 may be a liquid crystal display (LCD) or an organic light-emitting diode (OLED) display. The display screen may also be a touch screen. The processor 902 may be a central processing unit (CPU). The processor 902 may also include a hardware chip. The hardware chip may be an application-specific integrated circuit (ASIC), a programmable logic device (PLD), or a combination thereof. For example, the PLD may be a complex programmable logic device (CPLD), a field-programmable gate array (FPGA), or a combination thereof. The memory 903 may include a volatile memory. The memory 903 may also include a non-volatile memory. The memory 903 may also include a combination of the foregoing types of memories. The data interface 904 may include a keyboard, a mouse, a USB interface, and a communication interface. A user may use the keyboard, the mouse, and the USB interface to input the wafer image and the defect information. In some embodiments, the memory 903 stores program instructions. When the program instructions are executed, the processor 902 calls the program instructions stored in the memory 903 to perform: determining a region of interest (ROI) region in a bright voltage contrast (BVC) image for contact through-holes (CTs) of word lines, the CTs comprising first CTs in at least one first word line that is electronically charged and second CTs in at least one second word line that is not electronically charged, the ROI region comprising the at least one first word line; determining coordinates of each CT in the ROI region; reviewing a grayscale value at a position of coordinates of each second CT in the ROI region to determine whether a defective CT is in the at least one second word line; and displaying the defective CT, in response to a defective CT being determined in the at least one second word line.

In some embodiments, after the coordinates of each CT in the ROI region are determined, the processor 902 is further configured to execute the program instructions stored in the memory 903 to: sort the coordinates of the plurality of CTs in the ROI region in a horizontal direction and a vertical direction to remove redundant coordinates; calculate average gap distances between adjacent CTs in the horizontal direction and the vertical direction, respectively; and remove the coordinates of the CTs that substantially deviate from the calculated average gap distances in the horizontal direction and the vertical direction.

In some embodiments, when determining the coordinates of each CT in the ROI region, the processor 902 is further configured to execute the program instructions stored in the memory 903 to: calculate a grayscale value from red, green, and blue components for each pixel in the ROI region; perform a Gaussian smooth process and an erosion process in the ROI region; perform erosion on the ROI region of the image to form a plurality of dark dots; perform a binarization process in the ROI region to form a plurality of black dots;

identify a contour for each black dot in the ROI region; and determine a center of each contour as the coordinates of each CT.

In some embodiments, when converting three color components into the grayscale value for each pixel in the ROI region of the image, the processor 902 is further configured to execute the program instructions stored in the memory 903 to: calculate $Gray=0.299 \cdot R+0.587 \cdot G+0.114 \cdot B$, wherein Gray, R, G, and B are integers between 0 and 255, respectively.

In some embodiments, the grayscale value for black is 0; and the grayscale value for white is 255.

In some embodiments, when determining the center of each contour as the coordinates of each CT, the processor 902 is further configured to execute the program instructions stored in the memory 903 to: obtain the coordinates of a center of gravity of the corresponding contour based on a zero-order and a first-order moments of the corresponding contour, and determine the coordinates of the center of gravity of the corresponding contour as the coordinates of each CT.

In some embodiments, when reviewing the grayscale value at the position of the coordinates of each second CT in the ROI region to determine whether a defective CT is in the at least one second word line, the processor 902 is further configured to execute the program instructions stored in the memory 903 to: identify the at least one first word line and the at least one second word line in the ROI region; obtain the grayscale value at the position of the coordinates of each second CT in the ROI region; compare the obtained grayscale value with a grayscale threshold; and in response to the obtained grayscale value being greater than or equal to the grayscale threshold, determine the corresponding second CT to be the defective CT and a first CT in an adjacent first word line immediately adjacent to the corresponding second CT to be another defective CT.

In some embodiments, when displaying the defective CT with respect to the corresponding second word line, in response to the defective CT being determined in the at least one second word line, the processor 902 is further configured to execute the program instructions stored in the memory 903 to: display the defective CT in a tabular form, the tabular form including one or more of a defect ID, coordinates of an upper left corner of the image in a wafer, a tier number, a word line number, a circuit block ID, a test ID, a grayscale value, an image ID, a row ID, a pass/fail, and a contact type.

In some embodiments, when displaying the defective CT with respect to the corresponding second word line, in response to the defective CT being determined in the at least one second word line, the processor 902 is further configured to execute the program instructions stored in the memory 903 to: display the defective CT in a graphical form including a word line number in a horizontal axis and a count of defective CTs in corresponding word line indexed by the word line number in a vertical axis.

In some embodiments, when displaying the defective CT with respect to the corresponding second word line, in response to the defective CT being determined in the at least one second word line, the processor 902 is further configured to execute the program instructions stored in the memory 903 to: display the defective CT on a wafer image divided into a plurality of square-shaped portions, where each square-shaped portion includes multiple BVC images, and an upper left corner of each portion indicates a total number of defective CTs within the corresponding portion.

In some embodiments, the processor 902 is further configured to execute the program instructions stored in the memory 903 to: perform a semiconductor process on the CTs based on distribution of defective CTs, where the semiconductor process includes forming a metal layer in the CTs.

In some embodiments, the processor 902 is further configured to execute the program instructions stored in the memory 903 to: determine a word line shot between the defective CT in the at least one second word line and a CT in an adjacent first word line.

In the embodiments of the present disclosure, inspection of the image of the wafer to automatically detect the word line shorts substantially reduces inspection time. Further, the auto-detection device provides additional information that cannot be obtained during the manual inspection, such as by tier analysis and wafer level mapping. The accuracy of the auto-detection device is greater than 98%. Thus, the word line shorts auto-detection device takes less time, is more accurate, and provides more insights to the word line shorts defects.

The method provided by the embodiments of the present disclosure may also be used to detect other types of defects in the memory device as long as such defects can be captured in the BVC images and can be determined through evaluating grayscale values of the CTs.

The present disclosure also provides a non-transitory computer-readable storage medium. The non-transitory computer-readable storage medium stores a computer program. When being executed by a processor, the computer program implements the embodiments of the word line short auto-detection method shown in FIG. 1. The description thereof is omitted.

The non-transitory computer-readable storage medium may be an internal storage unit of the device described in any of the foregoing embodiments. For example, the non-transitory computer-readable storage medium may be a hard disk or an internal memory of the device. The non-transitory computer-readable storage medium may also be an external storage device of the device, such as a plug-in hard disk, a smart media card (SMC), a secure digital (SD) card, a flash card, etc. Further, the non-transitory computer-readable storage medium may also include an internal storage unit and the external storage device. The non-transitory computer-readable storage medium may also store the computer program, and other programs and data required by the device. The non-transitory computer-readable storage medium may also temporarily store already outputted data or to-be-outputted data.

Those skilled in the art should understand that all or part of the processes in the foregoing method embodiments can be implemented by instructing relevant hardware through a computer program. The computer program may be stored in the non-transitory computer-readable storage medium, and when being executed, the computer program implements the processes of the foregoing method embodiments. The storage medium may be a magnetic disk, an optical disk, a read-only memory (ROM), or a random-access memory (RAM).

The foregoing embodiments describe in detail the objective, the technical solution, and the beneficial effect of the present disclosure. The foregoing embodiments are only some of the embodiments of the present disclosure, which should not be used to limit the scope of present disclosure. Therefore, changes, equivalent replacements, and modifications made according to the claims of the present disclosure still fall within the scope of the present disclosure.

What is claimed is:

1. A method for detecting word line shorts in a memory device, comprising:
  determining a region of interest (ROI) region in a bright voltage contrast (BVC) image for contact throughholes (CTs) of word lines in the memory device,
    the CTs including first CTs in at least one first word line that is electronically charged, and second CTs in at least one second word line that is not electronically charged, and the ROI region including the at least one first word line;
  determining coordinates of each CT in the ROI region;
  sorting the coordinates of the CTs in the ROI region in a horizontal direction and a vertical direction to remove redundant coordinates, calculating average gap distances between adjacent CTs in the horizontal direction and the vertical direction, respectively, and removing the coordinates of the CTs that substantially deviate from the calculated average gap distances in the horizontal direction and the vertical direction;
  reviewing a grayscale value at a position of the coordinates of each CT in the ROI region to determine whether the CT is a defective CT; and
  displaying the defective CT in response to the defective CT being determined.

2. The method according to claim 1, wherein determining the coordinates of each CT in the ROI region comprises:
  calculating a grayscale value from red, green, and blue components for each pixel in the ROI region;
  performing a Gaussian smooth process and an erosion process in the ROI region;
  performing a binarization process in the ROI region to form a plurality of bright or dark dots;
  identifying a contour for each of the plurality of bright or dark dots; and
  determining coordinates of a center of each contour as the coordinates of each CT.

3. The method according to claim 1, wherein reviewing the grayscale value at the position of the coordinates of each second CT in the ROI region to determine whether the CT is the defective CT comprises:
  identifying the first CTs in the at least one first word line and the second CTs in the at least one second word line in the ROI region;
  obtaining the grayscale value at the position of the coordinates of each second CT;
  comparing the obtained grayscale value with a grayscale threshold; and
  in response to the obtained grayscale value being greater than or equal to the grayscale threshold, determining the corresponding second CT to be the defective CT and a first CT in an adjacent first word line immediately adjacent to the corresponding second CT to be another defective CT.

4. The method according to claim 1, wherein displaying the defective CT in response to the defective CT being determined comprises:
  displaying the defective CT in a tabular form, the tabular form including one or more of a defect ID, coordinates of an upper left corner of the BVC image in a wafer, a tier number, a word line number, a circuit block ID, a test ID, a grayscale value, an image ID, a row ID, a pass/fail, and a contact type.

5. The method according to claim 1, wherein displaying the defective CT in response to the defective CT being determined comprises:

displaying the defective CT in a graphical form including a word line number in a horizontal axis and a count of defective CTs in corresponding word lines indexed by the word line number in a vertical axis.

6. The method according to claim 1, wherein displaying the defective CT in response to the defective CT being determined comprises:

displaying the defective CT on a wafer image divided into a plurality of square-shaped portions, wherein each square-shaped portion includes multiple BVC images, and an upper left corner of each portion indicates a total number of defective CTs within the corresponding portion.

7. The method according to claim 1, wherein determining the ROI region in the BVC image for the CTs of the word lines in the memory device comprising:

based on a layout of the memory device, selecting at least one first word line;

electronically charging the CTs in the at least one first word line;

scanning a region containing the at least one first word line to obtain the BVC image; and determining the region containing the at least one first word line in the BVC image to be the ROI region in the BVC image for the CTs of the word lines in the memory device.

8. The method according to claim 2, wherein determining the coordinates of the center of each contour as the coordinates of each CT comprises:

obtaining coordinates of a center of gravity of each contour based on a zero-order and a first-order moments of the corresponding contour; and determining the coordinates of the center of gravity of the corresponding contour as the coordinates of each CT.

9. A device for detecting word line shorts in a memory device, comprising:

a display screen;

a memory storing program instructions; and a processor configured to execute the program instructions stored in the memory to:

determine a region of interest (ROI) region in a bright voltage contrast (BVC) image for contact through-holes (CTs) of word lines in the memory device, the CTs comprising first CTs in at least one first word line that is electronically charged and second CTs in at least one second word line that is not electronically charged, and the ROI region comprising the at least one first word line;

determine coordinates of each CT in the ROI region;

sort the coordinates of the CTs in the ROI region in a horizontal direction and a vertical direction to remove redundant coordinates, calculate average gap distances between adjacent CTs in the horizontal direction and the vertical direction, respectively, and remove the coordinates of the CTs that substantially deviate from the calculated average gap distances in the horizontal direction and the vertical direction;

review a grayscale value at a position of the coordinates of each CT in the ROI region to determine whether the CT is a defective CT; and display the defective CT in response to the defective CT being determined.

10. The device according to claim 9, wherein when determining the coordinates of each CT in the ROI region, the processor is further configured to:

calculate a grayscale value from red, green, and blue components for each pixel in the ROI region;

perform a Gaussian smooth process and an erosion process in the ROI region;

perform a binarization process in the ROI region to form a plurality of bright or dark dots;

identify a contour for each of the plurality of bright or dark dots; and determine coordinates of a center of each contour as the coordinates of each CT.

11. The device according to claim 9, wherein when reviewing the grayscale value at the position of the coordinates of each second CT in the ROI region to determine whether the CT is the defective CT, the processor is further configured to:

identify the first CTs in the at least one first word line and the second CTs in the at least one second word line in the ROI region;

obtain the grayscale value at the position of the coordinates of each second CT;

compare the obtained grayscale value with a grayscale threshold; and in response to the obtained grayscale value being greater than or equal to the grayscale threshold, determine the corresponding second CT to be the defective CT and a first CT in an adjacent first word line immediately adjacent to the corresponding second CT to be another defective CT.

12. The device according to claim 10, wherein when determining the coordinates of the center of each contour as the coordinates of each CT, the processor is further configured to:

obtain coordinates of a center of gravity of each contour based on a zero-order and a first-order moments of the corresponding contour; and determine the coordinates of the center of gravity of the corresponding contour as the coordinates of each CT.

13. A non-transitory computer-readable storage medium storing a computer program for detecting word line shorts in a memory device, the computer program performing:

determining a region of interest (ROI) region in a bright voltage contrast (BVC) image for contact through-holes (CTs) of word lines in the memory device, the CTs comprising first CTs in at least one first word line that is electronically charged and second CTs in at least one second word line that is not electronically charged, and the ROI region comprising the at least one first word line;

determining coordinates of each CT in the ROI region;

sorting the coordinates of the CTs in the ROI region in a horizontal direction and a vertical direction to remove redundant coordinates, calculating average gap distances between adjacent CTs in the horizontal direction and the vertical direction, respectively, and removing the coordinates of the CTs that substantially deviate from the calculated average gap distances in the horizontal direction and the vertical direction;

reviewing a grayscale value at a position of the coordinates of each CT in the ROI region to determine whether the CT is a defective CT; and displaying the defective CT in response to the defective CT being determined.

14. The non-transitory computer-readable storage medium according to claim 13, wherein when determining the coordinates of each CT in the ROI region, the computer program further performing:

calculating a grayscale value from red, green, and blue components for each pixel in the ROI region;

performing a Gaussian smooth process and an erosion process in the ROI region;

performing a binarization process in the ROI region to form a plurality of bright or dark dots;

identifying a contour for each of the plurality of bright or dark dots; and determining coordinates of a center of each contour as the coordinates of each CT.

15. The non-transitory computer-readable storage medium according to claim 13, wherein when reviewing the grayscale value at the position of the coordinates of each second CT in the ROI region to determine whether the CT is the defective CT, the computer program further performing:

identifying the first CTs in the at least one first word line and the second CTs in the at least one second word line in the ROI region;

obtaining the grayscale value at the position of the coordinates of each second CT;

comparing the obtained grayscale value with a grayscale threshold; and in response to the obtained grayscale value being greater than or equal to the grayscale threshold, determining the corresponding second CT to be the defective CT and a first CT in an adjacent first word line immediately adjacent to the corresponding second CT to be another defective CT.

16. The non-transitory computer-readable storage medium according to claim 14, wherein when determining the coordinates of the center of each contour as the coordinates of each CT, the computer program further performing:

obtaining coordinates of a center of gravity of each contour based on a zero-order and a first-order moments of the corresponding contour; and determining the coordinates of the center of gravity of the corresponding contour as the coordinates of each CT.

* * * * *